United States Patent [19]

Cline

[11] Patent Number: 4,726,863

[45] Date of Patent: Feb. 23, 1988

[54] METHOD OF MAKING HIGH STRENGTH PAPERBOARD PANEL

[75] Inventor: Thomas L. Cline, Hanover, Pa.

[73] Assignee: Corra-Board Products Co., Inc., Hanover, Pa.

[21] Appl. No.: 50,415

[22] Filed: May 18, 1987

[51] Int. Cl.$^4$ .............................................. B29C 65/54
[52] U.S. Cl. .................................. 156/210; 156/290; 156/292; 156/306.6; 162/149
[58] Field of Search ............... 162/149; 428/113, 182, 428/186, 138, 105–106, 178, 537.5; 206/450, 524.2, 424; 150/52 R; 281/15 R; 156/160, 167, 176, 205, 208, 210, 275.1, 275.3, 276, 290–292, 306.6, 308.4, 87, 301, 242; 229/3.5 R, DIG. 2, DIG. 5

[56] References Cited

U.S. PATENT DOCUMENTS

| | | | |
|---|---|---|---|
| 1,605,953 | 11/1926 | Howard | 428/113 |
| 1,959,193 | 5/1934 | Boeye | 229/23 R |
| 3,303,814 | 2/1967 | Nitchie | 156/205 |
| 4,002,790 | 1/1977 | Trewiler | 428/212 |
| 4,262,050 | 4/1981 | Jenkins | 428/138 |
| 4,348,450 | 9/1982 | Shaw | 428/182 |
| 4,522,667 | 6/1985 | Hanson | 156/87 |
| 4,552,792 | 11/1985 | Julian | 156/306.6 |

Primary Examiner—Merrell C. Cashion, Jr.
Attorney, Agent, or Firm—Daniel J. O'Connor

[57] ABSTRACT

A method of producing paperboard and a paperboard structure wherein the grain lines of upper and lower chipboard panels are aligned at right angles in relation to the undulations formed in a midstratum layer to yield an overall panel assembly having a high degree of bending resistance.

The invention also relates generally to a panel method of assembly having a particular novel layered construction. In place of a conventional solid chipboard laminated construction, an undulated midstratum layer is utilized in such manner that air cells or pockets are formed within the structure. An overlayer and an underlayer are adhesively applied to the undulated midstratum layer. The invention results in a panel assembly which may be much more economically manufactured while yielding superior end product strength and durability. The invention has widespread utility as a superior substitute for the currently used solid laminated chipboard design.

1 Claim, 4 Drawing Figures

METHOD OF MAKING HIGH STRENGTH PAPERBOARD PANEL

This application is generally related to copending U.S. applications Ser. Nos. 923,478 and 940,446, now U.S. Pat. No. 4,703,854.

BACKGROUND AND OBJECTS OF THE INVENTION

Paperboard panel assemblies currently in use are formed of a multi-layered solid laminated chipboard as shown in the prior art drawing of FIG. 1B.

The laminated solid chipboard structures of the prior art typically comprise five or more layers, three of which are shown at 31, 32 and 33 of FIG. 1B. Each layer must be fully joined to an adjacent layer by adhesives 35 as is known in the art.

Chipboard is a term known to those of skill in the art to signify paper products processed from, for example, waste paper materials and thus having relatively short fiber lengths contained therein as shown at numerals 40 in the prior art showing at FIG. 1B.

Because chipboard is, by definition, formed of short fiber length materials, it inherently has low original position memory. That is, once bent, chipboard is unable to successfully return to its original desired flat position. Because of such low memory by chipboard products, it has been required to typically utilize five or more chipboard layers in the formation of paperboard panels. The required usage of such a high number of chipboard layers has increased adhesives costs and manufacturing time and materials cost generally.

Accordingly, it is an object of the present invention to provide a panel structure which is less costly to manufacture and ship than the conventionally used laminated solid chipboard design.

It is a further object to reduce manufacturing costs by effectively using air cells within the panel assembly to reduce overall materials costs.

It is a still further object of the invention to significantly reduce the cost of adhesives used in the production of panels.

It is a further object to demonstrate a panel construction which can be bent without the cracking inherent in prior art designs.

It is a still further object to provide a panel construction which has a higher original position memory than has been heretofore known in the art.

It is a further significant object of the present invention to produce a paperboard panel having the same or increased thickness as prior art designs while decreasing panel weight and improving panel durability.

It is also an object of the invention to demonstrate an advantageous paperboard panel construction which utilizes an undulated midstratum layer having significantly longer average fiber lengths relative to an overlayer and underlayer which are formed of chipboard materials having significantly shorter average fiber lengths therein.

It is a further highly significant object of the present invention to produce a paperboard panel having a higher degree of bending resistance in all directions as compared to prior art systems heretofore known. Such is accomplished by means of a particular grain alignment pattern.

Further objects and advantages of the present invention will become apparent as the following description proceeds, and the features of novelty characterizing the invention will be pointed out with particularity.

PRIOR ART PATENTS

The most closely related prior art patents currently known to the inventor herein are listed as follows: U.S. Pat. No. 4,002,790 issued to Trewiler; U.S. Pat. No. 4,348,450 issued to Shaw; U.S. Pat. No. 4,522,667 issued to Hanson; and U.S. Pat. No. 4,522,792 issued to Julian.

BRIEF DESCRIPTION OF THE DRAWING FIGURES

DESCRIPTION OF THE PREFERRED EMBODIMENT

Figure 1A:
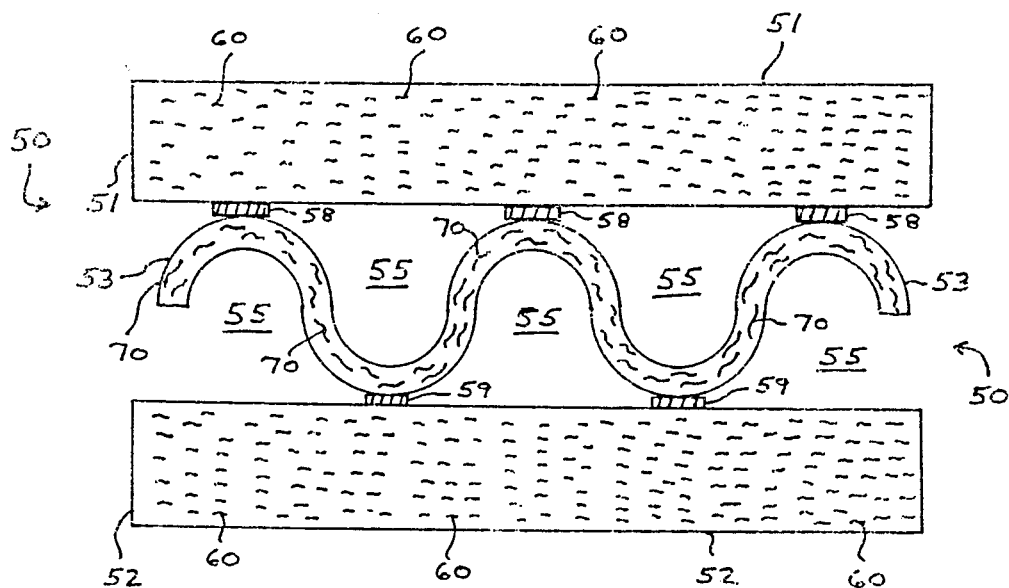
FIG. 1A is a side sectional view illustrating the construction details of the present invention.

As shown in FIG. 1A, the panel construction of the present invention comprises an overlayer 51 of chipboard having relatively shorter fiber lengths 60 contained therein. Underlayer 52 also comprises chipboard material with corresponding shorter fiber lengths 60.

FIG. 1A further illustrates an undulated midstratum layer 53 wherein the upper undulation portions are bonded by adhesive 58 to overlayer 51. Similarly, the lower undulation portions are bonded by adhesive shown at 59.

In the preferred embodiment of FIG. 1A, the undulated midstratum layer 53 is further shown as being comprised of a paperboard material having relatively longer fiber lengths 70 as compared to the shorter fiber lengths 60 shown in the overlayer 51 and the underlayer 52.

Figure 1B:
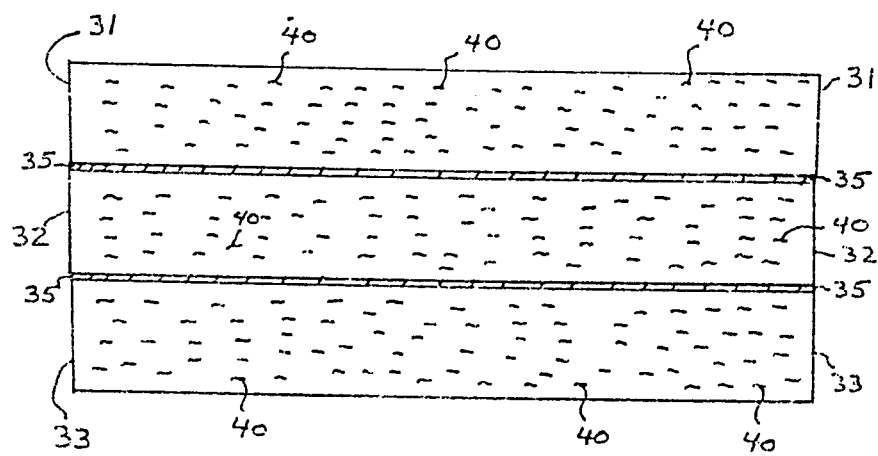
FIG. 1B is a view, similar to FIG. 1A, which illustrates the prior art solid laminated chipboard construction currently used for paperboard panels.

By reason of the construction of FIG. 1A, it is seen that air cells or spaces 55 are formed internally of the panel structure thus reducing the materials cost in the overall manufacture of the present design. In effect, air spaces are used in place of the chipboard product. It is also apparent that the amount of adhesives 58, 59 required by the inventor's design is greatly reduced as compared to the adhesive requirements shown at 35 of prior art FIG. 1B.

While very significantly reducing manufacturing costs, the inventor herein has also discovered that a superior end product is produced. The longer fiber length 70 materials used in the undulating midstratum layer result in a greater original position memory for the overall structure —i.e. it tends to spring back to its original desired flat position if bent as contrasted to the low memory solid chipboard (FIG. 1B) which tends to crack if bent from its desired flat position.

The undulated shape of the midstratum layer also produces a spring-like effect for the overall panel 50 so that it is more resilient when subject to bending or other potentially destructive usages.

Figure 2:
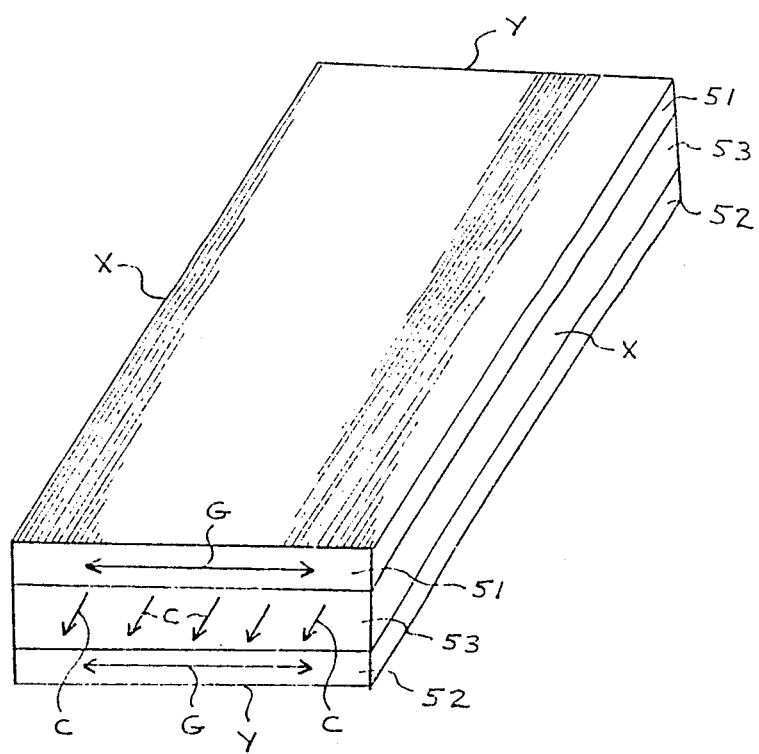
FIG. 2 is an overall view of a panel utilizing the principles of the present invention which illustrates, in schematic form, the important arrangement of the chipboard grain lines in relation to the channels formed in a midstratum layer.

FIG. 2 illustrates another highly significant aspect of the present invention. As before, layers 51 and 52 comprise the chipboard overlayer and underlayer respectively. As shown, the chipboard layers 51 and 52 have grain lines G which run from right to left in FIG. 2. As is known generally in the papermaking arts, the grain line refers to the arrangement or direction of fibers forming the paper.

As is further illustrated in FIG. 2, the channels formed by way of the undulations in the midstratum layer 53 are shown by arrows C as being at right angles to the grain lines G.

The significance of the constructional arrangement shown in FIG. 2 is that a very high degree of bending resistance is achieved. If, for example, the panel of FIG. 2 is grasped at edges Y and a bending force is applied, such force is strongly resisted by reason of the longitudinal strength of the undulating midstratum layer 53. If the panel of FIG. 2 is grasped at edges X and a bending force is applied, such force is strongly resisted by reason of the grain lines G in the chipboard layers 51 and 52; in effect, the force is being applied against the grain and thus the panel has a high degree of bending resistance in this direction also.

The importance of the above feature, i.e. chipboard grain lines of panels 51 and 52 being aligned at right angles to the midstratum layer channels, lies in the fact that a much more durable and long lasting panel is produced as compared to structures heretofore known in the art. Thus, the paperboard panel of the present invention may be utilized in many high stress areas in which prior art weaker paperboard structures would not be suitable. The paperboard panel of the present invention is virtually unbendable in normal contemplated usages.

From the foregoing, it will be appreciated by those of skill in the art that the present invention greatly reduces material costs and product production time. The weight of the end product panel is significantly reduced thus reducing shipping costs. A thick and durable panel structure is achieved by substituting air spaces and an undulated midstratum layer for the more costly chipboard.

It is further highly significant that, relative to the prior art, the caliper or thickness of a panel may be increased without adding weight to the unit by reason of the air cell structure of the present invention.

As will be appreciated, a ½-inch thick panel formed utilizing the principles of the invention herein weighs significantly less than a solid ½-inch chipboard panel, thus reducing shipping weight and cost while increasing product durability.

Finally, the product is more resilient and less susceptible to the cracking problems inherent in the prior art solid laminated chipboard designs.

It is contemplated that adhesives cost savings on the order of 75 percent may be realized by use of the present invention. Further, the use of a product having less internal adhesives results in lower product warpage as compared to chipboard panel systems heretofore known in the art.

It is anticipated that the novel panel construction of the present invention will find widespread use in all systems which currently utilize the solid laminated chip-board design.

In practice of the invention, it is contemplated that the fibers 60 shown in the over and under chipboard layers 51 and 52 would have an average fiber length of 2 mm or less. It is further contemplated that the fibers 70 in the undulating midstratum layer 53 would have an average fiber length of at least 5 mm or more with the possibility of ranging up to 25 mm or more if a higher quality kraft process paper is utilized as the midstratum layer 53.

It is again emphasized that overall product weight and cost are reduced by reason of the air cells 55 which reduce the number of chipboard layers required in a paperboard panel construction. Simultaneously, the durability of the overall paperboard panel 50 is dramatically increased by reason of the undulating midstratum layer 53 and the relatively longer fiber lengths 70 contained therein which, as has been noted, improve the original position memory of the overall panel 50.

Overall panel strength and durability are also dramatically increased by reason of the chipboard grain line orientation previously described with reference to FIG. 2.

Figure 3:
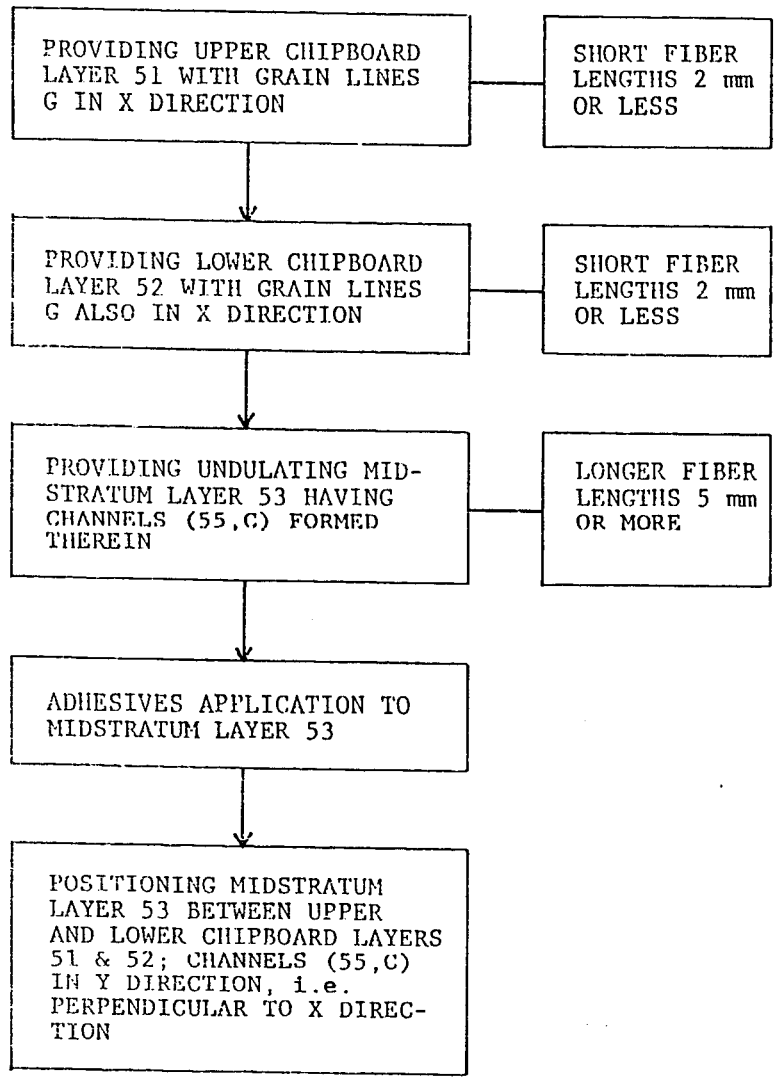
FIG. 3 shows, in block diagram form, the claimed method steps of the present invention.

The claimed method of making the product of the present invention is illustrated in block diagram form at FIG. 3. In discussing the method steps of FIG. 3, reference is also made to the numerals and letters shown in FIGS. 1A and 2.

As shown in FIG. 3, upper chipboard layer 51 is provided and arranged such that its grain lines G lie in a first or X direction. Next, the lower chip-board layer 52 is provided and arranged such that its grain lines G also lie in a first or X direction.

The two blocks in the upper right hand corner of FIG. 3 indicate that both the upper and lower chipboard layers, 51 and 52, have relatively shorter average fiber lengths of 2 mm or less.

Next, an undulating midstratum layer 53 is provided. The undulations in layer 53 result in channels being formed therein, such channels being indicated generally at numerals 55 of FIG. 1A and at letters C of FIG. 2.

As further indicated in the block diagram of FIG. 3, midstratum layer 53 has relatively longer average fiber lengths therein, i.e. 5 mm or more.

As also shown in FIG. 3, adhesives are applied to the upper and lower edges of midstratum layer 53 as indicated by numerals 58 and 59 in FIG. 1A.

The final method step shown in FIG. 3 is the positioning of the midstratum layer 53 between chip-board layers 51 and 52 such that the channels 55,C are arranged at right angles to the grain lines G of the upper and lower chipboard layers. Such results in an enhanced strengthening of the paperboard product as previously discussed.

It is noted that the adhesives application step may be accomplished in other ways and still remain within the spirit and intended scope of the invention. For example, adhesives 58 may be first applied to the upper edge of the midstratum layer 53 which is then joined to chipboard layer 51. Subsequently, adhesives 59 may be applied to the lower edge of the midstratum layer 53 which is then joined to the chipboard layer 52.

The important aspect of the invention lies in the positioning of grain lines G in upper and lower chipboard layers 51 and 52 at right angles to the channels 55, C formed in the undulating midstratum layer 53.

Also of importance to the invention is the method of utilizing relatively longer fiber lengths in the midstratum layer 53 as compared to the relatively shorter fiber lengths in the upper and lower chipboard layers 51 and 52.

As previously discussed, such usages result in an economy of manufacture and enhanced paperboard strength which has not been realized in prior art methods of paperboard assembly.

While there has been illustrated and described what is at present considered to be a preferred embodiment of the present invention, it will be appreciated that numerous changes and modifications are likely to occur to those of skill in the art, and it is intended herein to cover all those changes and modifications which fall within the true spirit and scope of the present invention.

I claim:

1. A method of making a paperboard panel comprising the following steps:
   (a) positioning a first flat paperboard layer (51) having grain lines (G) such that said grain lines are arranged in a first predetermined direction,
   (b) positioning a second flat paperboard layer (52) having grain lines (G) such that said grain lines are arranged in a first predetermined direction and such that said second flat paperboard layer lies beneath and spaced from said first flat paperboard layer,
   (c) providing an undulating midstratum layer (53) having upper and lower edges and plural channels (55, C) formed therein,
   (d) applying adhesive means (58, 59) to the upper and lower edges of said undulating midstratum layer (53),
   (e) positioning said undulating midstratum layer (53) between said first flat paperboard layer (51) and said second flat paperboard layer (52) such that said plural channels (55, C) are arranged in a second predetermined direction lying substantially perpendicular to said first predetermined direction,
   wherein said first flat paperboard layer (51) is comprised of chipboard material having short fiber lengths contained therein,
   wherein said second flat paperboard layer (52) is comprised of chipboard material having short fiber lengths contained therein,
   wherein said undulating midstratum layer (53) is comprised of paperboard material having long fiber lengths contained therein,
   wherein said first and second flat paperboard layers (51, 52) have average short fiber lengths contained therein of 2 mm or less,
   wherein said undulating midstratum layer (53) has average long fiber lengths contained therein of 5 mm or more,
   wherein the upper undulation portions of said midstratum layer (53) are secured directly to said overlayer (51) by adhesive means (58), and
   wherein the lower undulation portions of said midstratum layer (53) are secured directly to said underlayer (52) by adhesive means (59).

* * * * *